United States Patent [19]

Tada et al.

[11] Patent Number: 5,532,862
[45] Date of Patent: Jul. 2, 1996

[54] LINE SWITCHING SYSTEM

[75] Inventors: Katsuyuki Tada; Katsuya Kitamori, both of Kawasaki, Japan

[73] Assignee: Fujitsu Limited, Kanagawa, Japan

[21] Appl. No.: 302,419

[22] Filed: Sep. 8, 1994

[30] Foreign Application Priority Data

Mar. 16, 1994 [JP] Japan .................... 6-072511

[51] Int. Cl.⁶ .................................. H04B 10/08
[52] U.S. Cl. .................... 359/161; 359/110; 359/119; 359/166; 359/177
[58] Field of Search ................... 359/110, 166, 359/119, 177, 161; 370/13, 16.1

[56] References Cited

U.S. PATENT DOCUMENTS

| | | | |
|---|---|---|---|
| 4,313,224 | 1/1982 | Wakabayashi | 359/110 |
| 4,887,309 | 12/1989 | Andersson | 359/177 |
| 5,119,222 | 6/1992 | Hara | 359/110 |
| 5,159,595 | 10/1992 | Flanagan | 370/16 |
| 5,365,510 | 11/1994 | Nicholson | 370/16 |

FOREIGN PATENT DOCUMENTS

| | | | |
|---|---|---|---|
| 0018604 | 7/1979 | Japan | 359/177 |
| 0142044 | 9/1982 | Japan | 359/177 |
| 2019167 | 10/1979 | United Kingdom | 359/110 |
| 2245122 | 12/1991 | United Kingdom | 359/110 |

Primary Examiner—Leslie Pascal

[57] ABSTRACT

An optical transmission system includes a plurality of nodes connected via optical transmission lines in a ring form. When an optical transmission line is disconnected or a fault is found on the optical transmission device of a node, a transmission line is switched over to another transmission line by a line switching system which includes optical transmission lines of a working line for transmitting optical data signals and a protection line for transmitting APS (Automatic Protection Switch) bytes. Each of the nodes has a comparing and detecting unit for receiving the APS bytes sent from an adjacent node and comparing a fault pattern indicated by the APS bytes with a fault pattern stored in advance, and a processing unit which determines a line switching route, based on the result of comparison in the comparing and detecting unit.

6 Claims, 10 Drawing Sheets

FIG. 2

K1 byte

| SW Priority | Destination ID |

K2 byte

| Source ID | Status |

SW Priority: showing the importance of the fault
(The importance of SW request)

Destination ID: showing the arrival node number of the data
(It shows the adjacent node number in the normal state, and the APS node in the fault state)

Source ID: showing the original node number of the data

Status: showing the answering status for the SW request
(It shows the state of confirmation of SW request)

⟵⟶ : WORK PATH
⟵-----⟶ : PROTECT PATH

⟷ : Work line
·····> : No fault route (Example of other detour route)

LINE SWITCHING SYSTEM

BACKGROUND OF THE INVENTION

1. Field of the Invention

The present invention relates to a line switching system. More particularly, it relates to a line switching system that switches over a transmission path where a transmission line between nodes is disconnected or fault is found on an optical transmission device at nodes, in an optical transmission system in which a plurality of optical transmission devices are connected in a ring form via optical transmission lines.

2. Description of the Related Art

In recent years, large transmission capacity and flexibility of services have been desired, which can make the form of line connections flexible in an add/drop system of an optical transmission system.

At the same time, it becomes indispensable to use a line switching system which can deal with the fault of the transmission lines with a high speed, to improve reliability of line services.

FIG. 6 is a diagram for explaining a conventional line switching system in an optical transmission system, in which a plurality of nodes (#A to #D) are connected in a ring form via optical transmission lines. In FIG. 6, reference numerals 70 to 73 are nodes (#A to #D) in the optical transmitting system.

The nodes (#A to #D) 70 to 73 are connected in a ring form by optical transmission lines 75 to 78. Further, optical transmission lines 75 to 78 transmit optical signals in both directions.

Each of the nodes is an optical transmission device, which multiples digital signals DSn to create paths #1 to #3, and transmits data of optical signals in EAST sections 701, 711, 721 and 731 and WEST sections 702, 712, 722 and 732, with an appropriate time slot carrier.

Each of the EAST sections 701, 711, 721, and 731, and the WEST sections 702, 712, 722 and 732 is a circuit having functions of OE/EO conversion, multiplication and fault detection.

In FIG. 6, the transmission lines 75 to 78 for the optical signals are shown with thick lines, and the transmission lines for the digital signals in each optical transmission device are shown with fine and dotted lines. The optical signal has time slots, at which paths #1 to #3 can be transmitted.

In the example of FIG. 6, the path #3 of the node 70, the path #1 of the node 71 and the path #2 of the node 71 are connected to the path #3 of the node 72, the path #1 of the node 73 and the path #2 of the node 73 for transmitting data, respectively.

In a normal state, data are transmitted in the direction shown with fine arrows. Thus, all of time slot carriers of the optical signal on the optical transmission line 78 between the node 70 and the node 73 are used for paths #1 to #3. The time slot carriers of the optical signal on the optical transmission line 76 between the node 71 and the node 72 are not used (shown with the broken lines in FIG. 6).

With such as a structure, the case where the optical transmission line 77 is disconnected at the fault point Px will be considered as follows. The same data is generally sent in both directions of the EAST section and the WEST section from the sending side, and data sent in either one of both directions is selected on the receiving side.

In the case where the optical transmission path is disconnected at the fault point Px, the system detects the disconnection in the WEST section 722 of node 72 and the EAST section 731 of node 73, and sends a switching signal AIS (Alarm Indication Signal) to all paths #1 to #3.

The paths #1 to #3, which received the switching signal AIS switch the receipt side to the reversed side. For example, path #3 switches from the direction of the side of EAST section 701 to that of WEST section 702 in node 70 shown in FIG. 6.

In the structure of the conventional line switching system as explained above, the switching is executed between the paths, so that it is required to reserve a protection line for switching, even between the nodes, which do not terminate the paths, namely, between nodes 71 and 72 in FIG. 6. That is the drawback of the conventional system, which would make transmitting efficiency worse.

To improve the conventional system of FIG. 6, a two-fiber switching system has been proposed, which has flexibility to select a switching route. In the system, APS (Automatic Protection Switch) byte, used as a redundancy data in a signal frame, is exchanged between the adjacent nodes hereinafter referred to as APS nodes, and switching is executed to a selected route according to the APS bytes, designated as K1 and K2 bytes as defined by the Bellcore Recommendation TR-NWT-00253.

FIG. 7 shows a basic structure of the 2-fiber switching system for switching with the APS bytes. Same reference numerals and symbols are used to denote and identify the elements corresponding to same elements shown in FIG. 6. In a normal state, a signal is transmitted in one direction on one of a pair of optical transmission lines 75 to 78.

In the case where the optical transmission lines are disconnected at the fault point Px shown in FIG. 7, node 72 and node 73 exchange data by using the APS bytes on the route which is not disconnected, the data from the node 73 to the node 72 is looped back to the route which is not disconnected (the side of WEST section of node 73), and the data from node 72 to node 73 is looped back to the route which is not disconnected (the side of EAST section of node 72), and the flows of the signals are turned in the reversed direction on the other pair of optical transmission lines 75 to 78.

In this system, it is also possible to detour signals by using the time slot carrier of the optical signal of another system as shown in FIG. 8. More particularly, in FIG. 8, reference numerals 80 and 81 show the nodes in the other system and which are connected by the optical transmission lines 82.

When the disconnection is found at the fault point Px between node 72 and node 73, the APS bytes are used between the appropriate APS nodes. The optical transmission lines 83 and 84 are connected to the path #1 of node 72 and the path #3 of node 73, respectively, so as to bypass between the fault point Px and another optical signal route reserved in advance, and idle time slots between node 80 and node 81 are used to detour the signals.

Further, with this system, there is no need to be conscious of the state for setting the lines of the entire system. Only finding a detour route is required for only the carrier sent and received between the APS nodes.

Thus it becomes possible to reduce the time required for switching and the amount of managing data.

However, such system has been realized with the line switching using the above-described APS bytes in the system in which a plurality of transmission devices are connected in a ring form.

SUMMARY OF THE INVENTION

Accordingly, it is an object of the present invention to provide a line switching system for switching lines by using APS bytes, in the case where the line disconnection between the nodes is found, or a fault is found in the transmission devices of the nodes, in an optical transmitting system in which a plurality of optical transmission devices are connected in a ring form, via optical transmission lines.

A line switching system for switching transmission lines of the present invention when a fault is found in a transmission line may comprise optical transmission lines, and a plurality of nodes connected in a ring form via the optical transmission lines, wherein nodes which are located adjacent to a place on the optical transmission lines, where a fault is found, exchange data using APS (Automatic Protection Switch) bytes to switch one transmission path to the other transmission path.

BRIEF DESCRIPTION OF THE DRAWINGS

FIG. 2 is a diagram showing an example of APS bytes;

DETAILED DESCRIPTION OF THE PREFERRED EMBODIMENTS

A conceptual structure of a point-to-point system, in which a line switching may be performed by using APS bytes will be explained for the better understanding of the invention, before preferred embodiments of the present invention will be described.

Figure 9:
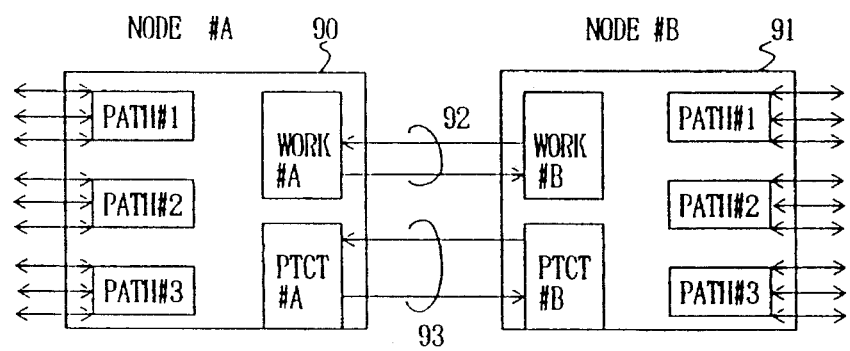
FIG. 9 is a block diagram of a structure of a point-to-point system.

FIG. 9 shows an example of the line switching system of the point-to-point structure.

Figure 10:
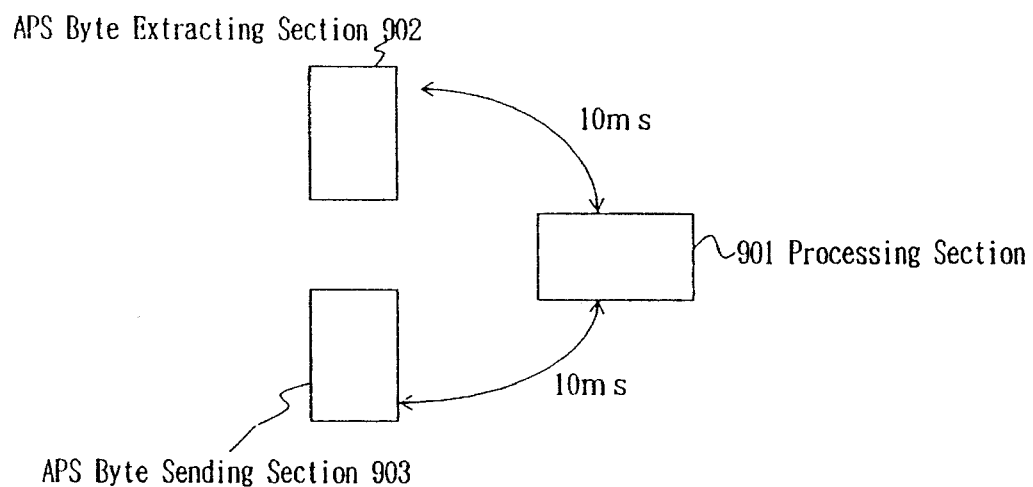
FIG. 10 is an explanatory diagram of a conception using APS byte processing, in the point-to-point system.

Further, FIG. 10 shows an explanatory diagram of APS byte processing in this structure, which has been proposed by the present applicants. An APS byte processing section 901, an APS byte extracting section 902 and an APS byte sending section 903 are provided as shown in FIG. 10, in each of the nodes 90 and 91 shown in FIG. 9, which nodes are connected via transmission lines 92 and 93, as facing each other.

Data is sent and received by using working transmission lines 92, in a normal state, as shown in FIG. 9, and APS bytes are sent and received by using protection transmission lines 93. The operation in the case where a fault is found in the working transmission lines 92 will be explained as follows.

The processing section 901 shown in FIG. 10, which is formed by a micro-computer, performs polling of the APS bytes within 10 ms period to monitor the status of the facing node, and issues a notice about the status of the own node to the facing node.

The APS byte extracting section 902 extracts the APS bytes sent according to a polling, and passes them to the processing section 901. Further, the APS byte sending section 903 sends the APS bytes according to the polling to the facing node, based on a command from the processing section 901.

Figure 11:
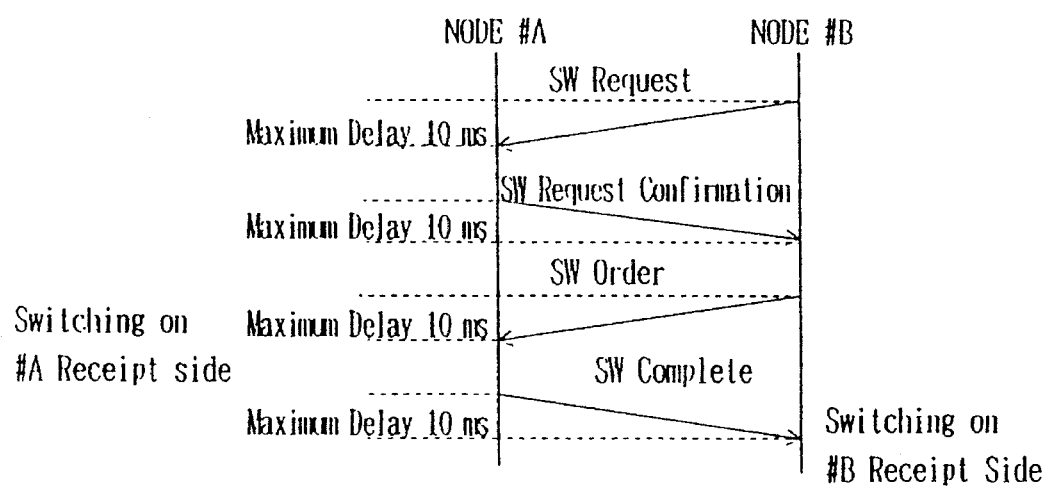
FIG. 11 shows a sequence flow according to the processing of FIG. 10.

FIG. 11 shows the sequence of sending and receiving the APS bytes between the nodes (#A) 90 and (#B) 91, when the fault is found on the working transmission line 92. The node (#B) 91 which detects the fault, sends a switching request to the facing node, that is, the node (#A) 90, and waits for confirmation of receiving the switching (SW) request from the facing node within a polling period.

The switching order (SW) is then sent from the node #B when switching (SW) request confirmation is received. The node #A that received the switching (SW) order switches the transmission line for sending and receiving the data for the first time, and notifies the completion of switching (SW) to the node #B.

The operation of switching the transmission line for sending and receiving the data is then performed in the node #B, which received information about the completion of switching, and finishes a series of switching operations at last.

In this system, the processing sections 901 of the nodes (#A) 90 and (#B) 91 require the maximum period of 10 ms to detect each change of the APS bytes, as the nodes (#A) 90 and (#B) 91 execute polling of each of the APS bytes within an independent period.

Figure 7:
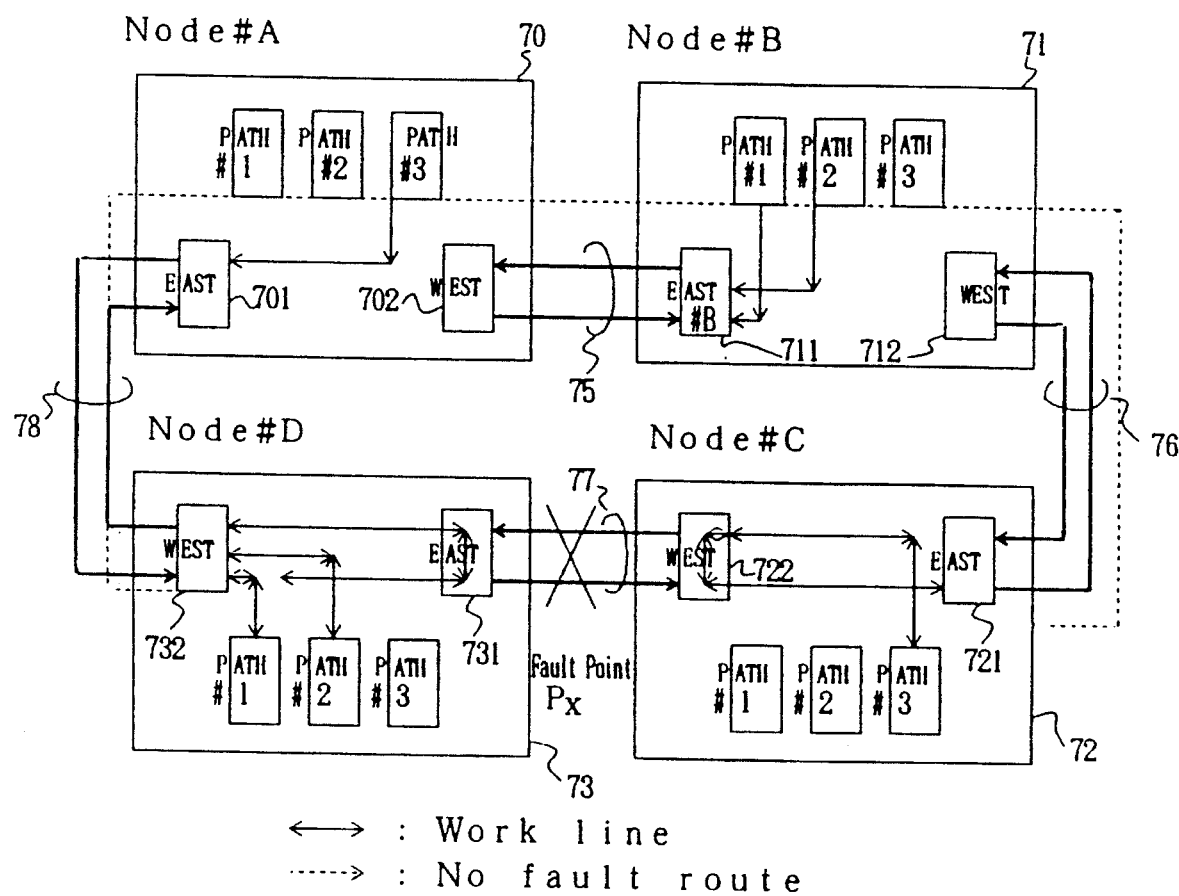
FIG. 7 is a diagram of a two-fiber switching system in a ring-formed system.
Figure 8:
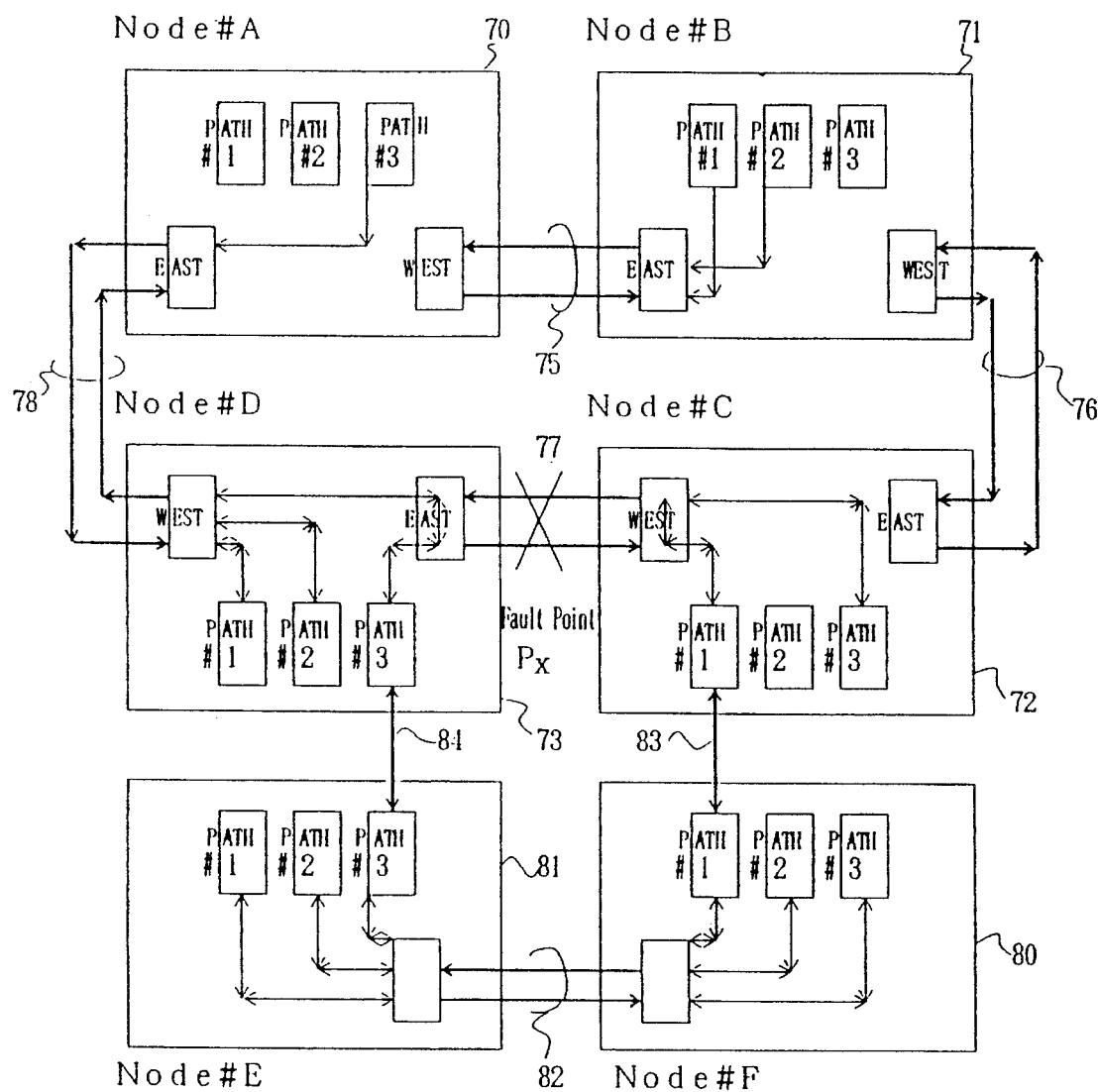
FIG. 8 is a diagram of another two-fiber switching system in a ring-formed system.

It is prescribed that the switching operation should be completed within 50 ms period. Accordingly, the APS byte processing as explained above with reference to FIGS. 9 to 11, which has been proposed by the present applicants can not be applied to the two-fiber switching system in a ring form as shown in FIG. 7, as it is.

This is because time required for transmitting data in one direction is (n−1)×10 ms (n means the number of the node in the ring-formed system), so that a series of the operations for switching can not be completed within 50 ms period.

Consequently, according to the present invention, the structure of the optical transmitting system having a plurality of transmission devices connected in a ring form, via transmission lines, is proposed, which performs a line switching, when a transmission line between the nodes is disconnected or a fault is found in an optical transmission device, by using APS bytes.

Figure 1:
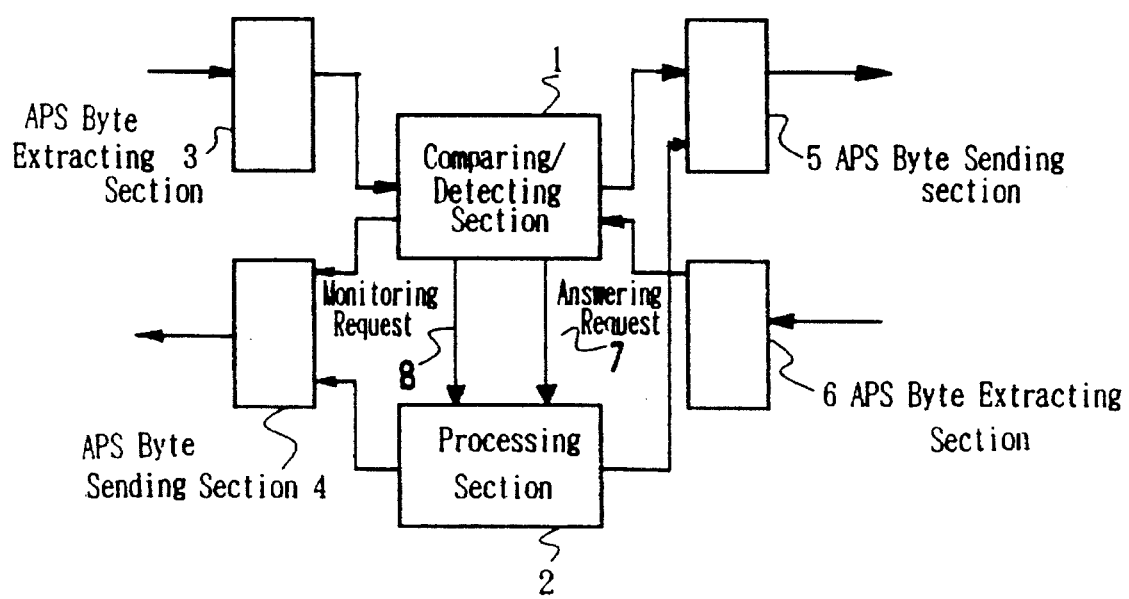
FIG. 1 is a block diagram of the system of the present invention.

FIG. 1 is a diagram of the structure of the system of the present invention. The structure shown in FIG. 1 which is provided in each node of FIG. 7, comprises a comparing/detecting section 1, a processing section 2 composed of a microcomputer, a pair of APS byte extracting sections 3 and 6, and APS byte sending sections 4 and 5.

The APS byte extracting section 3 provided in the EAST section of the node extracts APS bytes from the received signal and sends them to the comparing/detecting section 1. An answering request interruption 7 for requesting the answer, which is processed when the receipt of the APS byte is confirmed and a monitor request interruption 8 for requesting to monitor a fault in the system at a node other than APS nodes, are outputted from the comparing/detecting section 1.

The answering request interruption 7 and the monitoring request interruption 8 outputted from the comparing/detecting section 1 are sent to the processing section 2, and used as signals for starting the operation of the processing signal 2.

Further, a delay becomes smaller at any node among the plurality of nodes, regardless of a line switching, by passing the APS byte through the comparing/detecting section 1 when the fault is found.

The APS byte is terminated, and the processing which is the same as algorithm in the processing section 901 having the same structure as the point-to-point system described above in connection with FIG. 10, is performed in the APS nodes.

The processing section 2 composed of the micro computer, as described above, performs polling of APS bytes within the 10 ms period to monitor the status of the facing node and issues a notice about the status of the own node to the facing node.

The APS byte extracting section 3 extracts the APS bytes sent by the polling and passes them to the comparing/detecting section 1. The answering request interruption 7 and monitoring request interruption 8 are sent to the processing section 2, on the basis of the result of judgment in the comparing/detecting section 1.

The APS byte sending section 4, which is also provided in the EAST section of the node sends out APS bytes according to a polling sent from the facing node, based on a command from the processing section 2.

Further, the node which detected the fault as described above in connection with FIG. 11 sends a switching (SW) request to the other node, and waits for the confirmation of the switching (SW) request from the other node within the polling period.

A switching (SW) order is sent, when the switching (SW) request confirmation is received. The node which received the switching (SW) order switches the received data for the first time, and notifies the completion of switching (SW) to the other node. The node which received the completion of switching (SW) performs the operation for switching the optical transmission line by which data is sent and completes a series of switching operations.

Further, the nodes other than APS nodes monitor changes according to faults in the ring-formed system to suppress the latter event, and pass real APS data through.

FIG. 2 is a diagram showing an example of data transmitted with the APS bytes. The data is composed of K1 byte and K2 byte having areas required for 2 bytes which are added as redundancy data, in a data signal frame of 150 MBPS.

K1 and K2 bytes of the APS byte are defined by the Bellcore Recommendation TR-NWT-00253 as explained above.

K1 byte includes a SW Priority showing the importance of a fault (showing the importance of SW request) and a Destination ID (showing an adjacent node number in the normal status, and showing the APS node in the fault status).

K2 byte includes a Source ID for showing the original node number of data and a Status for showing the answering status for the SW request (showing the status of the confirmation of SW request).

Figure 3:
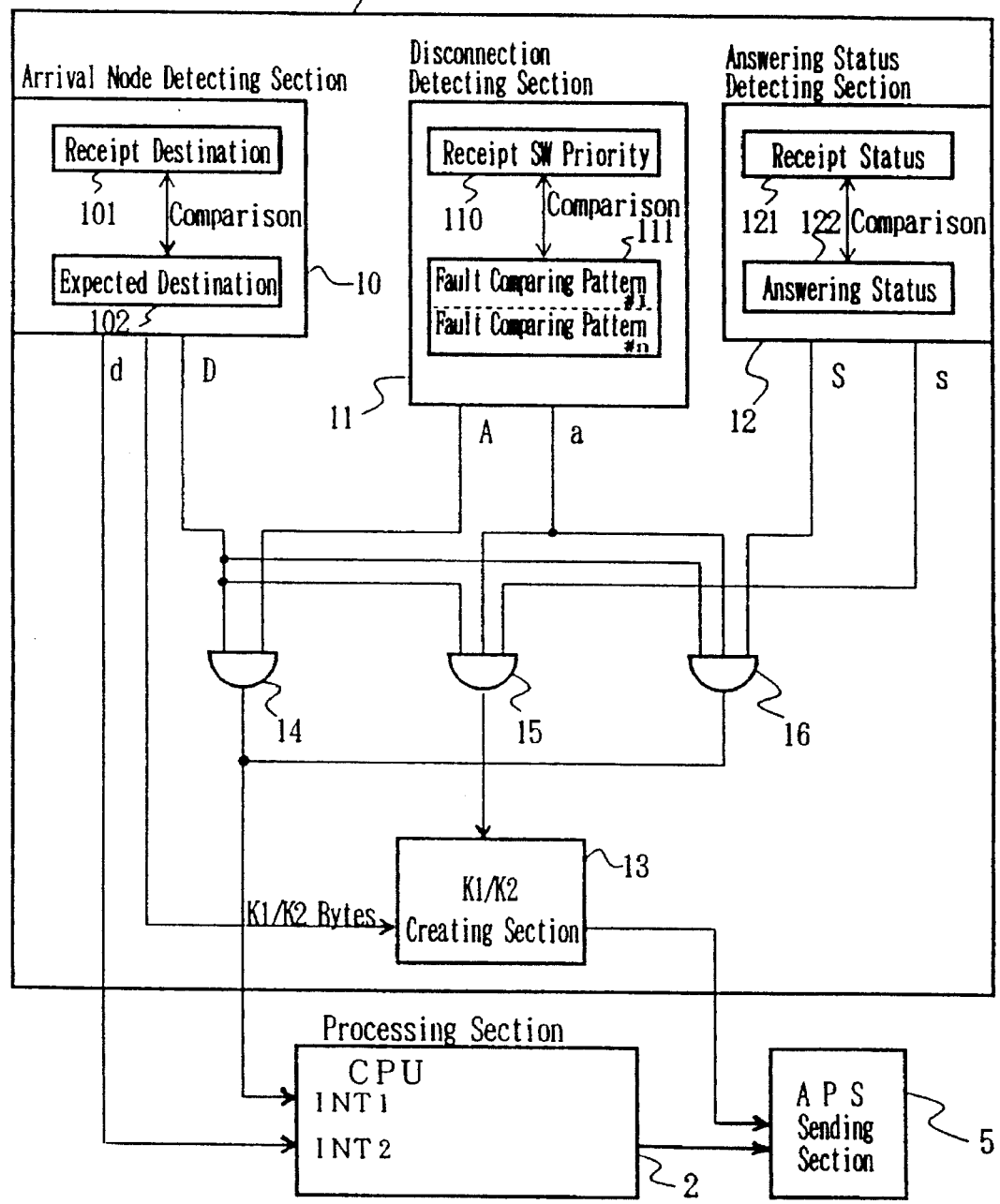
FIG. 3 is a block diagram showing an embodiment of the present invention.

FIG. 3 is a block diagram showing the detailed embodiment of the comparing/detecting section of the system shown in FIG. 1. The comparing/detecting section 1 includes an arrival node detecting section 10, a fault detecting section 11, an answering status detecting section 12, and K1/K2, that is, an APS byte creating section 13 and AND gate circuits 14 to 16.

The arrival node detecting section 10 comprises a comparing circuit 101 and a storing circuit 102. In the comparing circuit 101, a destination ID determined in advance and stored in the storing circuit 102, is compared with the destination ID of K1 byte (refer to FIG. 2) in the APS byte received and extracted by the APS byte extracting circuit 3.

As the result of comparison, if the above mentioned destination IDs correspond to each other, the signal D is outputted, and the signal d is outputted if they do not correspond to each other. The output signal D is led to one input terminal of the AND gate circuits 14, 15 and 16. On the other hand, the output signal d is inputted to the input terminal INT2 of the processing section 2, which is composed of CPU.

The fault detecting section 11 has a SW priority comparing circuit 110 and a pattern storing circuit 111, in which a plurality of fault patterns #1 to #n determined in advance are stored.

The SW Priority (refer to FIG. 2) showing the importance of the fault is taken out from K1 byte which is received and extracted by the APS byte extracting section 3, and compared and judged whether or not it corresponds to any of the plurality of fault patterns #1 to #n which are determined in advance and stored in the pattern storing circuit 111 of the fault detecting section 11.

As the result of comparison, if there is correspondence, signal A is outputted, and signal a is outputted if there is no correspondence. The output signal A is led to the other input terminal of the AND gate circuit 14. On the other hand, the output signal a is inputted to the input terminals of AND gates 15 and 16, respectively.

The answering status detecting section 12 comprises a comparing circuit 121 and a storing circuit 122. In the answering status detecting section 12, Status showing the answering status for the SW request according to K2 byte, which is received and extracted by the APS byte extracting section 3, is compared and it is judged whether or not it corresponds to the requirements of the answering status stored in the storing circuit 122.

As the result of comparison and judgment, if the answering status is shown, the output signal S is generated, and the output signal s is generated, if the answering status is not shown. The output signal S is led to one input terminal of the AND gate circuit 16. The output s is led to one input terminal of the AND gate circuit 15.

From the above explanation, it is understood that the arrival node detecting section 10, fault detecting section 11 and answering detecting section 12 principally have the functions of storing and comparing, and therefore, they may be respectively constructed with an appropriate memory and a comparator circuit.

The K1/K2 (APS byte) creating section 13 is triggered by the output from the AND gate circuit 15, when the arrival node detecting section 10 judges that the destination ID of K1 byte corresponds to the expected destination ID, the output signal a is generated from the fault detecting section 11, and the output signal s is generated from the answering status detecting section 12.

The destination ID of K1 byte given by the arrival node detecting section 10 is rewritten to the ID of the adjacent node in the K1/K2 creating section 13. Similarly, the K1/K2 creating section 13 updates the ID showing the original node number of data of K2 byte given by the arrival node detecting section 10, that is, the Source ID, to indicate the ID of the next node. Then, the newly created K1 byte and K2 byte are sent to the APS byte sending section 5.

Further, when the output signals D and A, or the output signals D, S and a are generated, INT1 interruption is inputted from the AND gate circuit 14 or the AND gate circuit 16 to the input terminal INT1 of the processing section 2 composed of CPU, as an answering request interruption.

On the other hand, when the output signal d is generated by the arrival node detecting section 10, INT2 interruption is inputted to the input terminal INT2 of the processing section 2, as a monitor interruption.

The answering request interruption and the monitor interruption are processed in the processing section 2, as will be explained below, according to the operation flows of FIGS. 4 and 5.

It also becomes possible to realize a general comparing/detecting section 1 so that processing section 2 sets the expected destination ID and fault comparing patterns stored in the storing circuit 102 of the arrival node detecting section 10 and in the storing circuit 111 of the disconnection detecting section 11, respectively.

Figure 4:
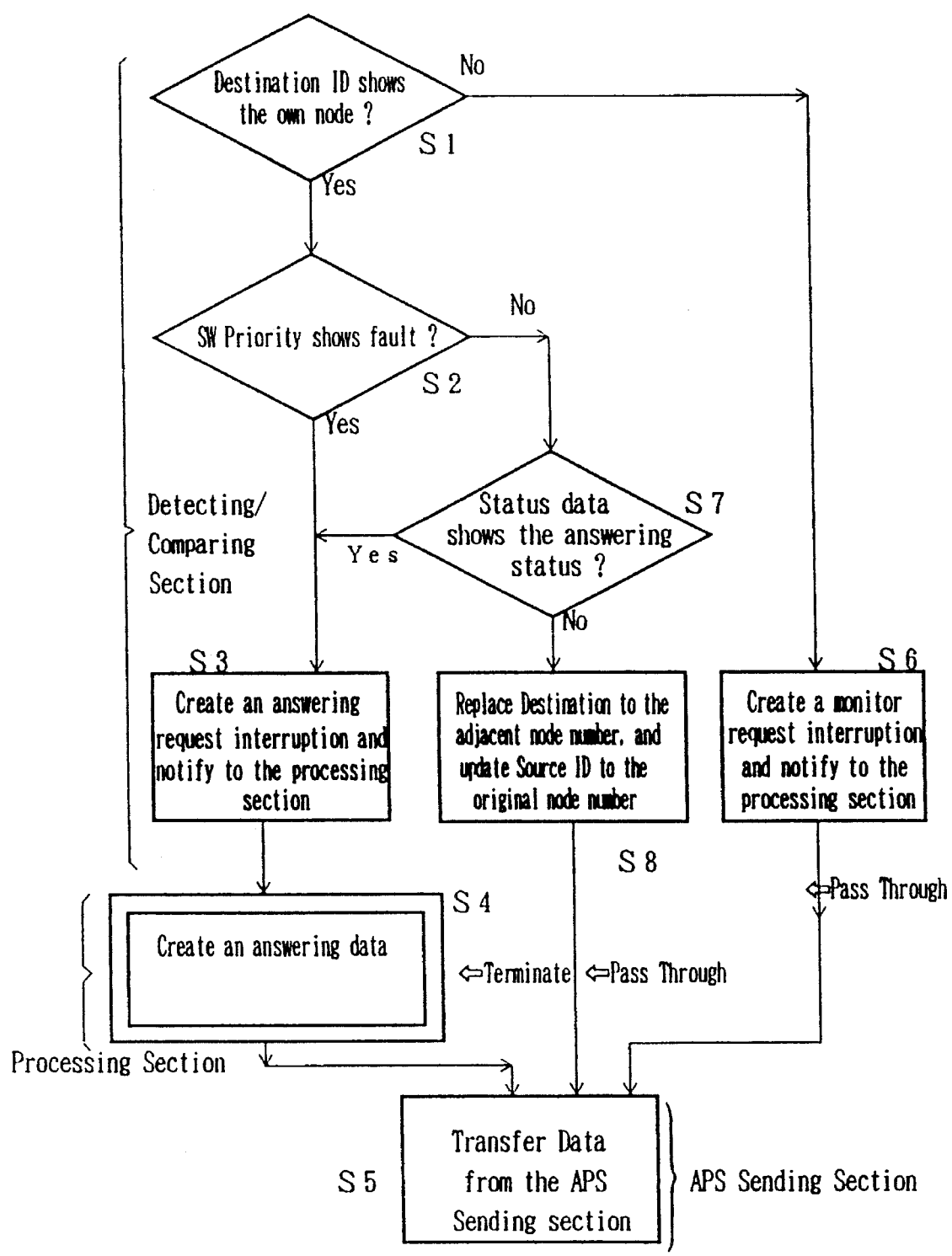
FIG. 4 illustrates an operation flow (No. 1) of the system of the present invention.
Figure 5:
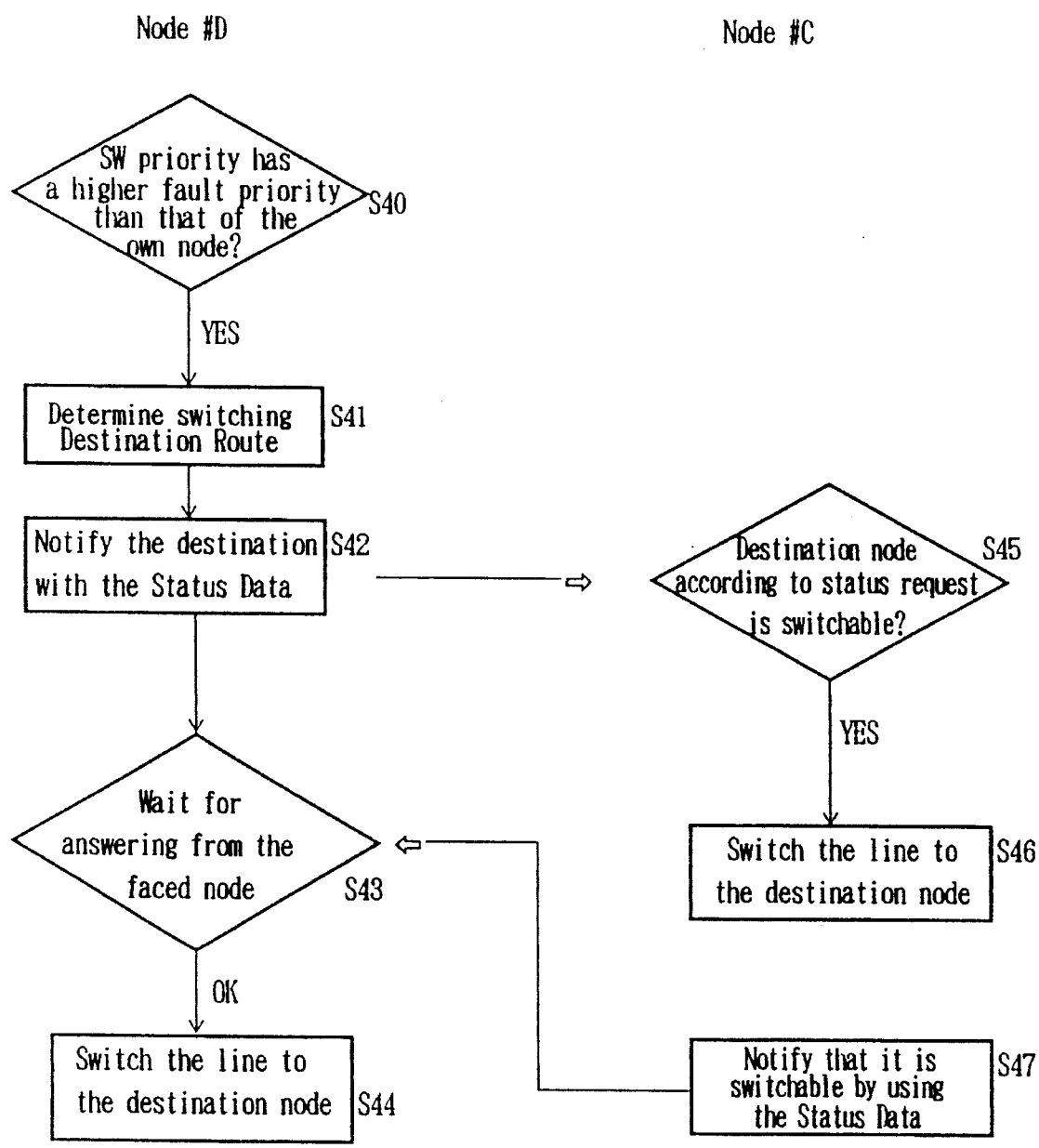
FIG. 5 illustrates an operation flow (No. 2) of the present invention.
Figure 6:
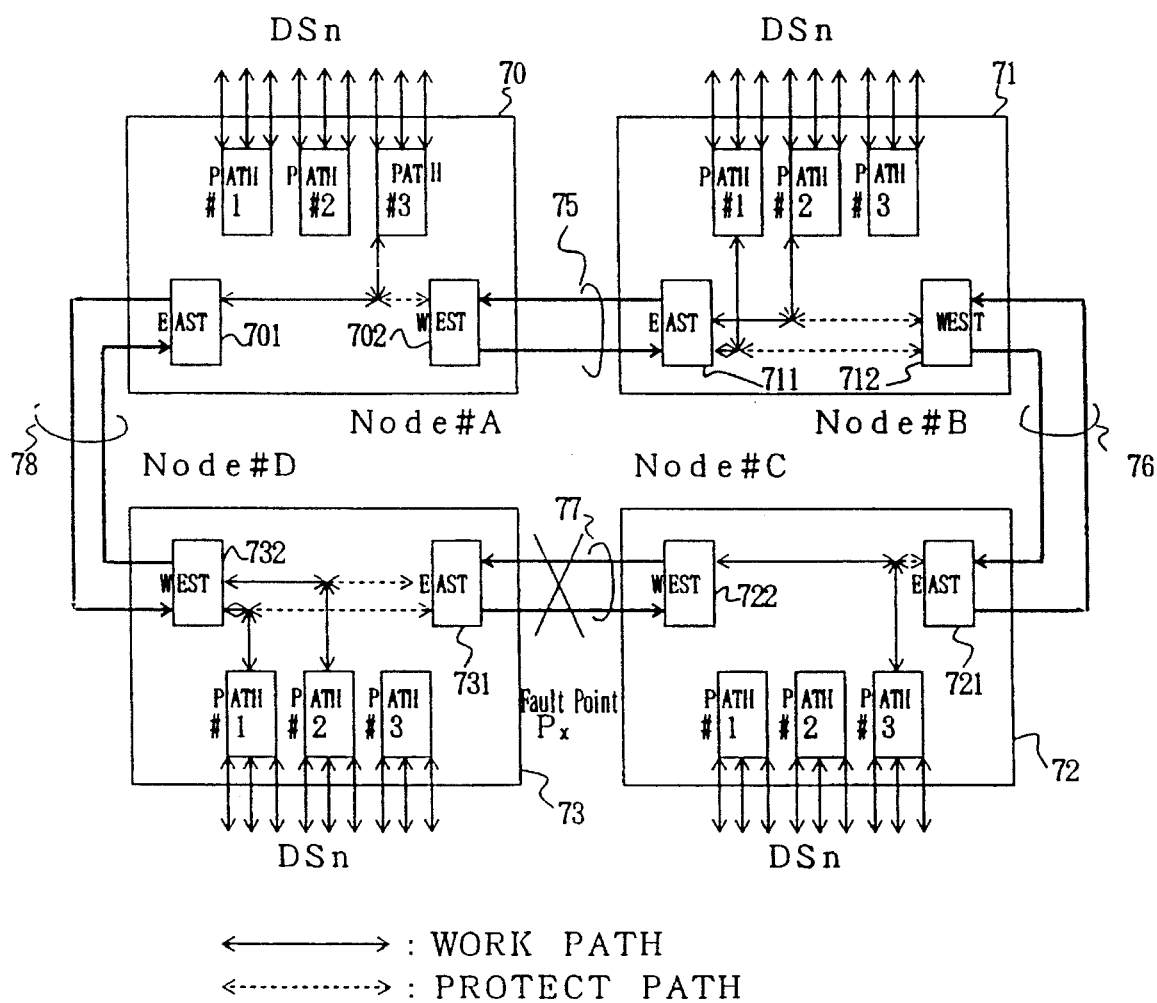
FIG. 6 is a block diagram of the prior art path switching system.

FIGS. 4 and 5 show operation flows according to the embodiment shown in FIG. 3. The operation according to the embodiment of the present invention will be further described as follows.

In FIG. 4, it is judged in the arrival node detecting section 10, at first, whether or not the receipt destination ID of the receipt K1 byte shows the own node (STEP S1). As described above, the judgment is performed according to the comparison of the expected destination ID in the storage circuit 102 with the received destination ID.

In the case where the received destination ID shows the own node, it is judged whether or not the SW priority showing the importance of the disconnection of K1 byte corresponds to any of the kinds of fault which are predetermined (STEP S2). The judgment is performed according to comparison with the fault comparing patterns #1 to #n stored in the storage circuit 111 of the fault detecting section 11.

When the SW priority corresponds to either of the fault comparing patterns #1 to #n, the comparison result is notified to the processing section 2 as an answering request interruption INT1 via the AND gate 14 (refer to FIG. 3) (STEP S#). The answering data is created, according to the operation flow shown in FIG. 4, as described later, in the processing section 2 (STEP S4).

On the other hand, in the step S1, when it is judged that the arrival destination ID does not show the own node, it is notified by the output signal d from the arrival node detecting section 10 to the processing section 2 as the monitor request interruption INT2 (STEP S6).

Further, in the judgment of the step S2, when the SW priority showing the importance of the disconnection corresponds to neither one of the fault patterns predetermined and stored in the storage circuit or memory 111, it is judged whether or not the status data of K2 byte in the APS byte shows the answering status for the SW request (STEP S7).

The judgment is performed according to the comparison of the answering status stored in the memory 122 with the received answering status. When the status data corresponds to the answering status stored in the memory 122, it is sent to the processing section 2 as the answering request interruption INT1 according to the processing of the step S3 (STEP S3).

When the status data does not correspond to the answering status stored in the memory 122, the output is sent via the AND gate circuit 15 to the K1/K2, that is, the APS byte creating section 13. When the output from the AND gate circuit 15 is sent to the APS byte creating section 13, the arrival node number (Destination ID) of data of K1 byte is replaced with the adjacent node number and the own node number is updated to the original node ID of data (Source ID) (STEP S8).

The APS bytes are transferred from the APS sending section 5 to the adjacent nodes without operations for switching in the appropriate node (STEP S5).

FIG. 5 shows an operation flow for creating the answering data between the APS nodes in the processing section 2. The processing section 2 receives the answering interruption request created in the step S3 and judges whether or not the SW priority showing the importance of the fault of K1 byte which is received, has a higher fault priority than that of the own node (consider as node #D) (STEP S40). When the received SW priority has a higher fault priority, the switching destination route is determined (STEP S41). The switching destination is notified to the original node (consider as node #C) with the Status data of K2 byte (STEP S42), and the node (#D) waits for answering from the facing node (#C) (STEP S43).

In the facing node (#C), it is judged whether or not the switching destination node specified according to the status data from the node (#D) is switchable (STEP S45). When it is switchable, the node (#C) notifies the switching to the appropriate switching destination node (STEP S46).

Further, in the case where the appropriate switching destination node can be switched from the node (#C), the information that the destination node can be switched is notified to the node (#D) by using the Status data of K2 byte (STEP S47). The node (#D) waits for the answer for the switching destination from the node (#C), and if the answering is received, the node (#D) switches the line to the appropriate switching destination, regarding as it can be switched (STEP S44).

These steps S40 to S44 shown in FIG. 5 correspond to the operation in the processing section 2, of the step S4 shown in FIG. 4, and the notification of the Status data to the node (#C) (STEP S42) is performed via the APS sending section 5.

As explained above, the present invention realizes the system which has flexibility for selecting the switching route at the time the fault is found and improves a series of switching operations within 50 ms period, in the optical transmitting system.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A line switching system for switching an optical transmission line in an optical transmission system for transmitting optical data signals between nodes, in the event of a fault at the nodes or a disconnection on the optical transmission line, comprising:

optical transmission lines of a working line for transmitting optical data signals and a protection line for transmitting APS (Automatic Protection Switch) bytes; and a plurality of nodes connected via the optical transmission lines in a ring form;

each of the nodes including a comparing and detecting section for receiving the APS bytes sent from an adjacent node and comparing a fault pattern indicated by the APS bytes with a fault pattern data stored in said node in advance, and a processing section for determining a line switching route, based on a result of comparison in the comparing and detecting section.

2. A line switching system according to claim 1, wherein the comparing and detecting section detects whether or not a number of a destination node indicated by the received APS bytes is an own number of the node receiving the APS bytes, said comparing and detecting section creating a monitor request when the number of the destination node is not the own number of the node receiving the APS bytes and passing the received APS bytes from the processing section to another adjacent node.

3. A line switching system according to claim 2, wherein each node monitors statuses of other nodes when the monitor request is created.

4. A line switching system according to claim 2, wherein the comparing and detecting section also detects a fault pattern of switch priority, indicating importance of a fault indicated by the received APS bytes and creates an answering request interruption when the fault pattern corresponds to one of predetermined fault patterns, and then the processing section creates answering data.

5. A line switching system according to claim 4, wherein the answering data created by the processing section indicates a switching destination determined when the switch priority is higher than the priority of a fault stored in the node and is sent to a node from which the APS bytes have been sent, as data showing an answering status for a switching request.

6. A line switching system according to claim 4, wherein the number of the destination node indicated by the APS bytes is replaced with a number of an adjacent node, the number of the node from which the APS bytes are sent is replaced with the own number of the node, and further updated APS bytes are transferred to the adjacent node.

* * * * *